Aug. 30, 1966

S. M. POOLE ETAL 3,269,030

FLIGHT SIMULATOR

Filed Feb. 6, 1964

Inventors
SAXON M. POOLE
GUY L. H. HERONDELLE
By Philip M. Bolton
Attorney

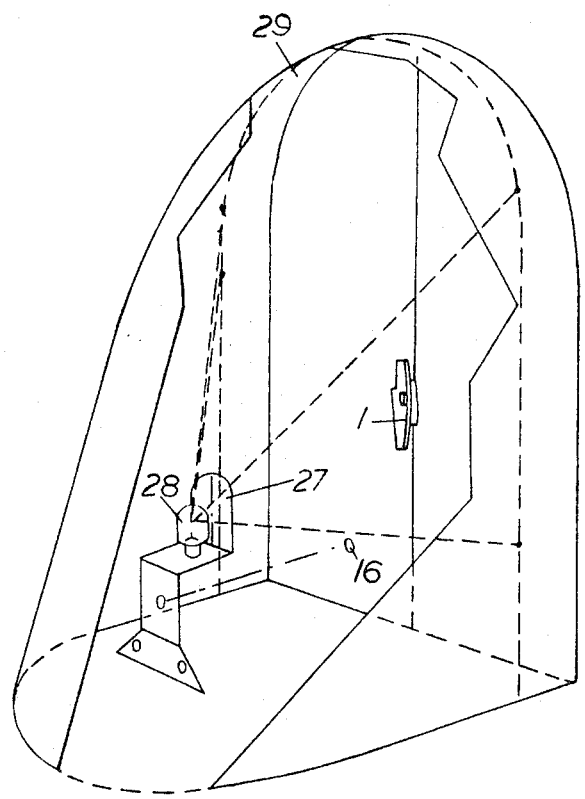

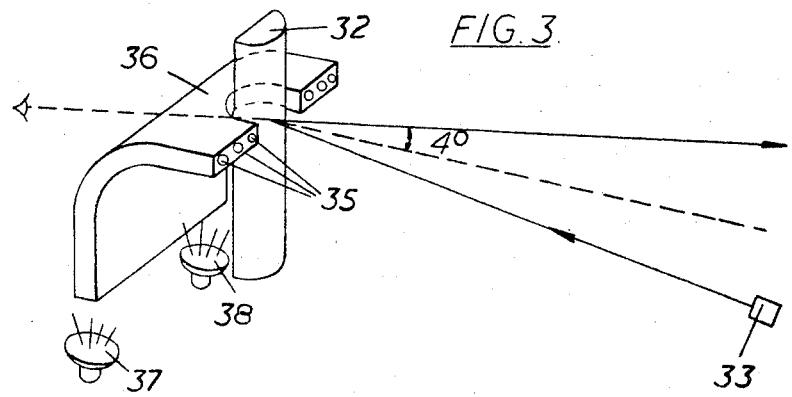
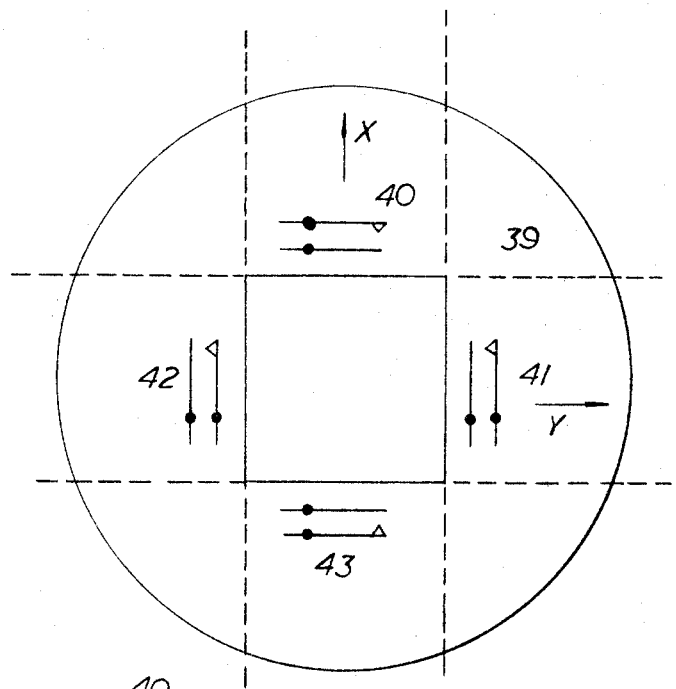
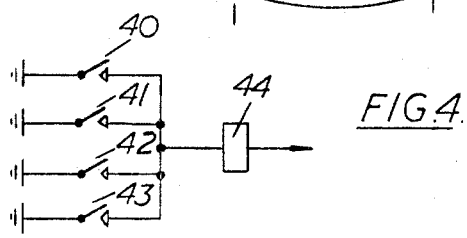
Inventors
SAXON M. POOLE
GUY L. H. HERONDELLE
By Philip M Bolton
Attorney 3,269,030
FLIGHT SIMULATOR
Saxon M. Poole, Paris, and Guy L. H. Herondelle, La Celle-Saint-Cloud, France, assignors to International Standard Electric Corporation, New York, N.Y., a corporation of Delaware
Filed Feb. 6, 1964, Ser. No. 343,053
9 Claims. (Cl. 35—12)

The simulation of flight conditions of an actual aircraft for training the pilots is now in current use. It enables the reflexes of the pilots to be developed and maintained without necessitating the use of an actual aircraft in flight, this leading to a substantial economy. It also enables dangerous flight conditions to be created which could not be achieved on a real aircraft.

Amongst the various phases of flight, those of the take-off and landing are probably the most important and their reconstitution in a simulator entails the visual presentation of the runway. One of the objects of the present invention is to provide an apparatus for the visual presentation of a runway, or the deck of an aircraft carrier, allowing to reproduce the carrier landing conditions. It is obvious that if, in the following specification, the embodiment more particularly concerns the landing on an aircraft carrier, this does not limit the scope of the invention which also applies to landing, for instance on a non-identified runway, or to bombing.

According to the invention, there is provided a model of mobile runway in a scenery comprising a celestial dome part and an earth or sea part in relation with a television camera, the output signals of which are transmitted to a receiver, wherein this image is projected on a screen suitably positioned before the pilot, the arrangement of said means and the linking thereof being characterized as will be stated hereinafter.

The relative model-to-camera motion having a similarity with the relative virtual runway-to-pilot motion is effected by shifting the camera along two rectangular coordinate axes X and Z, wherein Z represents the altitude, and shifting the runway model along the third orthogonal coordinate axis Y which has approximately the direction of the runway axis. The choice of the direction of axis Y in the direction of the runway permits to have the greatest length of the scenery in the general direction of the runway. Moreover, axis Y can be chosen the same as the runway axis. However, according to the invention, this will be avoided. In fact, the relative model-to-camera movement is obtained by analysing the relative speeds according to the three axes X, Y, Z, then by integrating said speeds $V_x$, $V_y$, $V_z$ in the driving servomechanisms of the camera and model. If axis Y would be the same as that of the model runway, the speed $V_x$ would be nil at least during the instants preceding the landing or carrier landing, i.e. during the most important instants in the operation of the apparatus. Then, the servomechanism integrating the speed $V_x$ would work during these instants in the worst operation conditions for an integrator, i.e. those wherein the electric threshold and the mechanical clearance have the greatest nuisance. Therefore, according to the invention, the axis Y is shifted by a few degrees with respect to the runway axis. This leads to a non-null speed $V_x$ at the instant of the landing or carrier landing.

Moreover, the relative angular model-to-camera movements, reconstituting the relative runway-to-aircraft movements, are realized as rotations of the camera axis around three axes X, Y and Z.

According to a feature of the invention, the viewing apparatus comprises a television camera the optical axis of which is parallel to the altitude axis Z, and a 45° mirror or isosceles right-angled prism so as to make the optical axis parallel to plane X–Y.

According to another feature of the invention, there is provided a rotation of the camera about its Z axis depending upon the relative heading of the aircraft carrier to be simulated.

According to another feature of the invention, there is provided a rotation of said mirror or said prism about an axis perpendicular to Z axis and to the viewing axis depending upon the relative pitch of the craft and aircraft carrier to be simulated.

According to another feature of the invention, there is provided in the optical path of the camera, a Wollaston prism adapted to rotate about the optical axis in response to the relative roll of the aircraft and aircraft carrier to be simulated.

One object of the invention is, in addition to the simulation of relative aircraft-to-runway movements, the simulation of the scenery surrounding said runway.

According to another feature of the invention, there is provided a shift of the celestial dome scenery linked to the altitude shift of the camera along axis Z in order that the partition line with the earth or sea scenery gives whatever may be the altitude, the same presentation of an horizon at infinity.

On the other hand, the celestial dome scenery consists of a skew surface coated with a material having a high reflective power, whereas the tint of the earth or sea scenery has low reflectivity, just above the sensitivity threshold of the camera.

According to another feature of the invention, there is provided an auxiliary horizon device adapted to mask the normal scenery and the model, for simulating the crossing of a cloudy region, as also the flight above such region.

Then, it is to be noted that the visual presentation apparatus according to the invention, is provided for cooperating with a flight simulator, i.e. an apparatus capable of simulating a higher altitude flight and comprising, for instance, the use of a radar. The whole of the visual presentation apparatus and the flight simulator allows the reconstitution of a complete mission or raid. Those skilled in the art know that a flight simulator comprises a flight deck, a map on which the flight is inscribed and a computer giving the aircraft positions and vectors from the pilot actions on the various controls of the flight deck.

On the other hand, it is obvious that the shifts of the camera and runway model are limited, with the boundaries $x_1$, $x_2$, $y_1$, $y_2$ and $z_1$, $z_2$ delimiting a parallelpiped. It is considered that the simulated aircraft, can go out of this limited space and if the model represents an aircraft carrier, said limited space moves about with it, as for example during the cruise phase.

Therefore, according to the invention, the servomechanisms for shifting and steering the camera and model operate as follow-up servomechanisms from the data provided by the simulator computer when the aircraft is out of the limited space.

On the other hand, these servomechanisms operate as integrators of relative linear and angular speeds of the relative model-to-camera motion when the aircraft is within the said limited space, said servomechanisms then providing flight data which are copied by the simulator computer.

In order to change from one operation to another there are provided switches at each limit of the limited space, each switch being "closed" when the limit has been exceeded, the switches further forming a circuit such that the visual presentation apparatus only operates when they are all "open."

The objects and features of the present invention will become more apparent by reference to the following description taken in conjunction with the accompanying drawings in which:

FIGURE 2 represents a modification of an embodiment of a scenery, according to the invention;

FIGURE 3 represents a light device in the model, and

FIGURE 4 represents the limited space of visual presentation and also the switching circuits related thereto.

Figure 1:
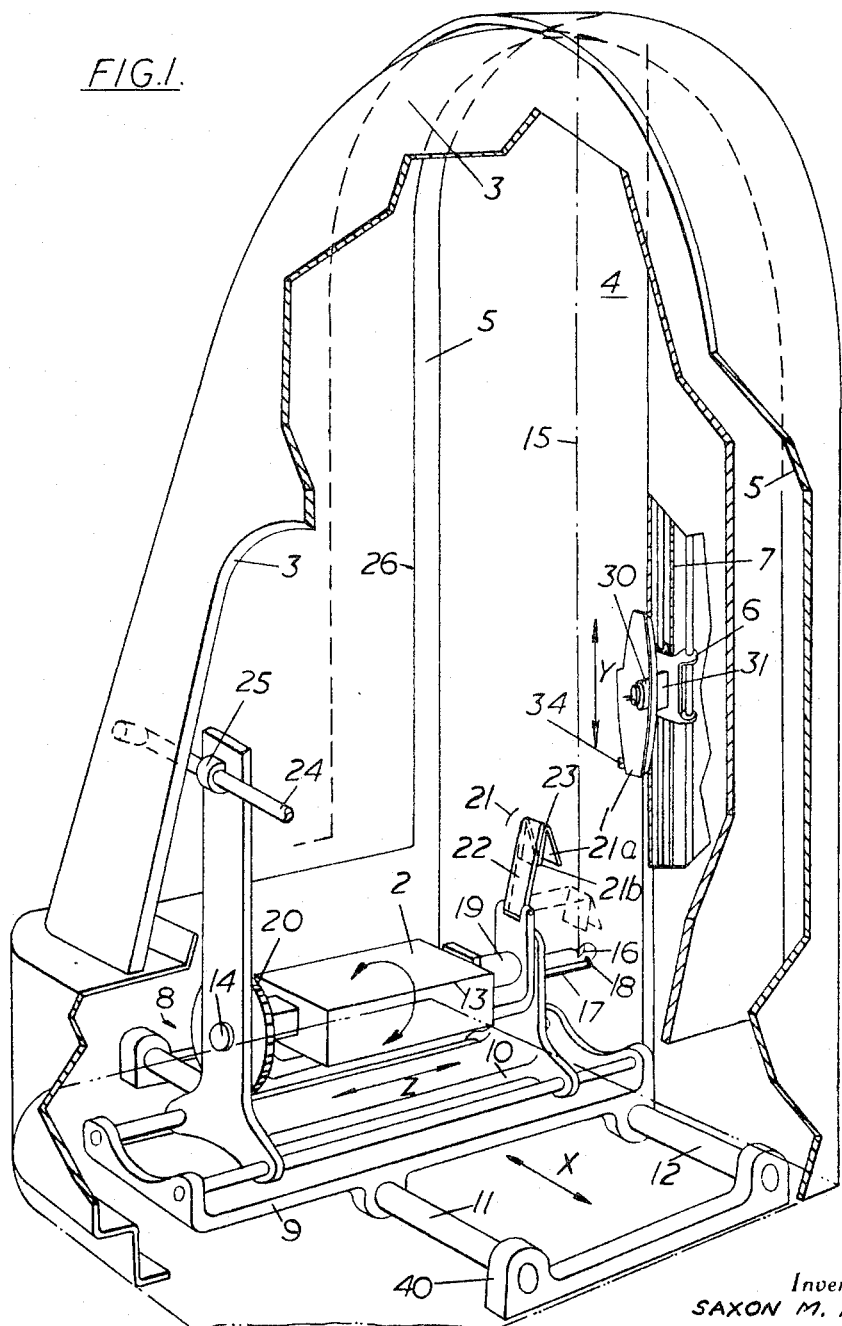
FIGURE 1 represents an embodiment according to the invention with a view partially broken out.

FIGURE 1 shows the relative configurations of the aircraft carrier model 1, the camera 2 and the scenery comprising the celestial dome 3 and the sea scenery comprising a bottom 4 and side walls 5.

Model 1 is carried by a small carriage 6, mobile according to axis Y and driven by a tape 7 linked to a servomotor, not shown. Camera 2 is carried by a carriage 8 comprising two parts, the one of which, 9, slides along X axis, and the other, 10, sliding along Z axis, part 10 being carried by part 9 and moving on the latter.

In accordance with the invention, having regard to the weight of the camera 2 and the weight of the components which will be hereinafter described, the carriage 8 must be strong and relatively cumbersome. On the other hand, the model of the aircraft carrier, is relatively light and is carried by a small carriage. Therefore, it has been chosen to represent axis Y vertical and plane ZX horizontal; concerning the scenery, this will involve that the bottom of the sea scenery will be vertical and the horizon will be also in the vertical plane. The part 9 of the carriage 8 is moving about on two parallel glides 11 and 12 driven by a tape linked to a servomotor, not shown. In the same way, the relative movement of part 10 and part 9 of carriage 8 is obtained by means of tapes linked to a servomotor, not shown, fixed on part 9. In order to simplify the schemata, the servomotors allowing these linear displacements have not been shown, nor those utilized for obtaining the angular displacements of the camera.

Camera 2 rotates about axis 13 comprising the end of cylinder 14 carried by part 10. The rotations of the camera about said axis involve a rotation of the viewing axis 15 of the camera which thus rotates about axis Z and simulates the heading of the aircraft. As the extremity of the camera, at 16, is placed a 45° mirror constituted by an isosceles rectangular prism in order to send back the light issued from the object of the camera the central point of which is near the horizon, in the camera axis mingled with axis Z. This prism is adapted to rotate about an axis parallel to plane ZX and perpendicular to 15 for simulating the pitch, that rotation being achieved by means of road 17 and knee 18 schematically represented in FIGURE 1. In the cylindrical part of the camera, between mirror 16 and the electrical analysis target, is placed a Wollaston prism which is adapted to rotate without restriction about Z axis, and which from the optical viewpoint, causes the rotation of the image about its axis, i.e. gives the visual presentation of the roll of the aircraft with respect to the aircraft carrier. This prism which has the property to rotate the image of an angle double its rotation angle, is driven by a servo-motor carried by the camera assembly near tube 19. A toothed-wheel 20 meshes with another wheel driven by servo-motor 14. Carried also by the camera is horizon system 21 comprising holder 22 which is adapted to rotate about axis 23; system 21 is constituted by an acute dihedron the bisecting plane of which is vertical by gravity, one face of the dihedron 21a being frosted and the other 21b transparent. When holder 22 leaves the vertical position indicated in FIGURE 1, part 21a covers up the object of the camera, simulating during the rotation of 22, the passage of the aircraft in a cloudy region. When holder 22 is, for instance, in its horizontal position, the camera sees above an artificial horizon line 23 a bright part constituting the sky scenery and under a dull part constituting the cloud scenery. It is to be understood that holder 22 is transparent in order to receive the light focussed by the celestial dome 3. The movement of holder 22 is controlled by a servo-motor carried by camera 2.

According to the invention, there is provided that the horizon line defined by the intersection of the celestial dome and the sea scenery seen from mirror 16, is displaced according to the altitude function.

In this embodiment, the displacement of the celestial dome 3 is related to the displacement of part 10 of carriage 8 through link 24 linked to said celestial dome and a slider 25 linked to part 10.

It results therefrom that the edge 26 of celestial dome 3 is at the same distance from the sea scenery as the extremity of camera 16. Edge 26 stands out in white against the side walls 5 of the sea scenery. As stated above, the tint of the sea scenery has a low reflectivity just under the sensitivity threshold of the camera, so that the side walls do not stand out against the tint of the sea 4, the right angle formed by the walls and the bottom being not perceived by the camera.

In order to obtain an illuminated sky, the inner side of the celestial dome 3 is covered with a white and highly reflective material but preferably mat. Moreover, in order to create irregularities in the aspect of this celestial dome, white parts, for instance in cotton-wool, have been placed into relief, which permit to obtain the visual presentation of the clouds. In a preferred embodiment of the invention, these flocks of cotton-wool are distributed according to practically vertical plans in order to give the presentation of the horizontal regions of clouds.

FIGURE 2 represents another embodiment of the sky-sea scenery, wherein the separation between the two sceneries is obtained by means of the cast shadow of a plate 27 illuminated by a lamp 28 giving a pinhole beam of light on an assembly constituted by a celestial dome terminated by a plate bottom 29, the part which remains illuminated by the lamp constitutes the sky scenery and the part which is hidden by plate 27 constitutes the sea scenery. It will be understood that lamp 28 may have a sufficient power in order to illuminate the assembly of the visual presentation.

In the embodiment shown in FIGURE 1, model 1 substantially represents an aircraft carrier with the control tower 30, the front of the model is directed upwards and it is the back part of the model which is generally seen by the camera. The model is carried by carriage 6 by means of a brace 31 which intersects the sea scenery during the displacement of the model. Behind, the model carries a tape in order to give the slip-stream presentation of the aircraft carrier, which, according to the invention, also enables to mask the intersection of the sea scenery enabling the passage of brace 31. The model is linked to brace 31 through a magnetic system from which it may be disjoined for palliating a defective carrier landing which may cause a damage to the lens of the camera. At the time of the carrier landing, the camera comes into contact with the deck of the model and, according to the invention, at the front part of the lens, there is provided an electrical contact, not shown, which permits to define the impact point on the runway, i.e. the impact point of the simulated aircraft. As above mentioned, if this impact point is defected too roughly, the model comes apart its carrier, switching off the electrical circuit which in turn disconnects the supply from the visual presentation apparatus. It is the crash case.

The control tower 30 of the model is also magnetically carried by model 1 and if the camera comes to knock against the control tower, the latter comes apart thus disconnecting the supply from the apparatus.

FIGURE 3 represents a device which enables to simulate the carrier landing mirror of an aircraft carrier. On an aircraft carrier, the carrier landing mirror is used for determining the angle of the descending axis of the aircraft with respect to the runway. For this reason, a mirror perpendicular to the runway is placed and illuminated by a projector at 4° from the horizontal line of the image seen by the pilot in the mirror. In fact, the position of the horizontal plan with respect to the projector is defined by the light line horizontally placed in the vicinity of the mirror. On the device of FIGURE 3, the mirror is a little cylindrical mirror 32 illuminated by a projector 33, the arrangement being carried by model 1 on the left part in the vicinity of point 34, FIGURE 1. On the other hand, the light ramps defining the horizontal line are shown in 35 and are constituted by little cones drilled in a solid transparent material 36 such as Plexiglas and which operates as a light guide illuminated by incandescent lamps 37 and 38 on the left and on the right, the remainder of the front face of 36 being dull. Moreover, in order to obtain a concentration of the light in cones 35, these cones are preferably filled up with a drop of glue which when dried takes the form of a lens.

On the other hand, when it is desired to avoid the carrier landing of the aircraft at the last moment, it is possible to simulate the wave off process by the flickering of ramps, i.e., by causing lamps 37 and 38 to flicker in turn.

FIGURE 4 is a plane view of the limited space of visual presentation and also the switching circuits related thereto. On this figure, a rectangle appears, the sides of which are parallel to X axis and Y axis. It is obvious that, when the aircraft is, with respect to this space for instance, in a chart scale 39, the camera for instance strikes against buffers 40 (FIG. 1) and the corresponding servo-mechanism is then blocked in this position. Likewise, the model is in a low or high position, in the above mentioned case in a high position, and the corresponding servomechanism is blocked in this position. Each blocking of the servomechanism on each stopping of model or carrier 9 of the camera, closes a contact such as those referenced 40, 41, 42 and 43. As soon as the aircraft has gone out of the limited space, it is obvious that one of these contacts is closed. These contacts may be mounted in shunt in circuits comprising: ground, make contact in shunt 40 or 43 and/or 41 or 42, electromagnetic relay 44 and battery. When the four contacts are open, i.e. when the relative position of the aircraft with respect to the model is inside the limited space, it is obvious that relay 44 is not operated, this corresponding to the switching of the visual presentation apparatus on the control apparatus at the pilot's disposal whereas, as soon as the relative position is such that the aircraft goes out of the limited space, relay 44 is operated and the servo-motors of the visual presentation apparatus then operate by cross-checking data provided by the computer of the associated simulator.

While the principles of the present invention have been described above in connection with specific embodiments, it is to be clearly understood that this description is made only by way of example and not as a limitation to the scope of the invention.

We claim:

1. A flight simulator for a pilot in training comprising a celestial dome and a scenic representation of land and sea, means for moving said celestial dome with respect to said scenic representation a television camera, a receiver, means coupling the output of said camera to said receiver, a screen disposed before the pilot to project the image obtained by said camera, means to shift the camera along two coordinate axes X and Z, where Z represents the altitude, and means to shift a runway model along the third orthogonal axis Y representing the direction of the runway axis, whereby there is affected a relative model-to-camera motion having a similarity with the relative runway-to-pilot motion.

2. A flight simulator according to claim 1 whereby the Y axis is shifted by a few degrees with respect to the runway axis to achieve a non-null speed $V_x$ at the instant of the simulated landing.

3. A flight simulator according to claim 2 wherein the optical axis of said television camera is parallel to the axis Z and further includes a reflecting member disposed at 45° to said axis.

4. A flight simulator according to claim 3 further including means to rotate said camera about the Z axis depending upon the relative heading of the aircraft and the landing surface to be simulated and means to rotate said reflecting member about an axis perpendicular to the Z axis and the viewing axis depending upon the relative pitch of the aircraft and the landing surface to be simulated.

5. A flight simulator according to claim 4 further including a Wollaston prism disposed in the optical path of the camera and adapted to rotate about the optical axis in response to the relative roll of the aircraft and the landing surface to be simulated.

6. A flight simulator according to claim 5 including means for shifting the celestial dome scenery linked to the altitude shift of said camera along the Z axis whereby the dividing line of the celestial dome scenery with the earth and sea scenery provides the same presentation of a horizon at infinity at any altitude.

7. A flight simulator according to claim 6 wherein said celestial dome scenery comprises a surface coated with a material having a high light reflective power, and the material of said earth and sea scenery has low light reflectivity and said television camera has a sensitivity threshold just below said low light reflectivity.

8. A flight simulator according to claim 7 further including an auxiliary horizon device to mask the scenery and the runway model to simulate the crossing of a cloudy region.

9. A flight simulator according to claim 1 wherein said means for shifting said camera and said model are servo mechanisms and further comprises a simulator computer and means coupling the output of said simulator computer to said servo mechanisms when the pilot in the simulated aircraft is out of a limited space defined by the shifts of the camera and the runway model and said servo mechanisms operate as integrators of relative linear and angular speeds of the relative model-to-camera motion when the simulated aircraft is within said limited space, said servo mechanisms then providing flight data to be copied by the simulator computer.

References Cited by the Examiner

UNITED STATES PATENTS

| | | | |
|---|---|---|---|
| 2,979,832 | 4/1961 | Klemperer | 35—12 |
| 2,981,008 | 4/1961 | Davis et al. | 35—12 |
| 3,012,337 | 12/1961 | Spencer et al. | 35—12 |
| 3,052,753 | 9/1962 | Schwarz et al. | 35—12 |
| 3,071,875 | 1/1963 | Hemstreet | 35—12 |
| 3,114,979 | 12/1963 | Fox | 35—12 |
| 3,122,845 | 3/1964 | Kebbon | 35—12 |
| 3,127,685 | 4/1964 | Ellison | 35—12 |

EUGENE R. CAPOZIO, *Primary Examiner.*

SHELDON M. BENDER, *Assistant Examiner.*